(12) United States Patent
Qiu et al.

(10) Patent No.: US 10,432,281 B2
(45) Date of Patent: Oct. 1, 2019

(54) COMMUNICATION BEAM DETERMINING METHOD AND CORRESPONDING APPARATUS

(71) Applicant: HUAWEI TECHNOLOGIES CO., LTD., Shenzhen, Guangdong (CN)

(72) Inventors: Jing Qiu, Chengdu (CN); Kin Nang Lau, Hong Kong (CN); Xiaona Wang, Chengdu (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/991,672

(22) Filed: May 29, 2018

(65) Prior Publication Data

US 2018/0278311 A1   Sep. 27, 2018

Related U.S. Application Data

(63) Continuation of application No. PCT/CN2016/104149, filed on Oct. 31, 2016.

(30) Foreign Application Priority Data

Nov. 30, 2015  (CN) .......................... 2015 1 0860704

(51) Int. Cl.
*H04B 7/06* (2006.01)
*H04W 72/04* (2009.01)

(52) U.S. Cl.
CPC ........... *H04B 7/0617* (2013.01); *H04B 7/063* (2013.01); *H04B 7/0626* (2013.01);
(Continued)

(58) Field of Classification Search
CPC .. H04B 7/0617; H04B 7/0619; H04B 7/0621; H04B 7/0632; H04B 7/0634
See application file for complete search history.

(56) References Cited

U.S. PATENT DOCUMENTS

2007/0182619 A1   8/2007   Honda et al.
2012/0196591 A1   8/2012   O'Keeffe et al.
(Continued)

FOREIGN PATENT DOCUMENTS

CN          1985187 A       6/2007
CN        101329397 A      12/2008
(Continued)

*Primary Examiner* — Kevin Kim
(74) *Attorney, Agent, or Firm* — Womble Bond Dickinson (US) LLP

(57) ABSTRACT

A communication beam determining method and a corresponding apparatus are disclosed. The method includes respectively sending, by a network side device, downlink sounding signals by using M beams with a first width, where main lobe directions of any two of the M beams are different; receiving, by the network side device, sounding results returned by user equipment (UE), and determining N beams with a second width based on the sounding results, where the second width is less than the first width, a coverage area of a set of the N beams is smaller than a coverage area of a set of the M beams, and M and N are integers and not less than 2; and respectively sending, by the network side device, downlink scanning signals by using the N beams, and determining, based on scanning results returned by the UE, a first beam for data transmission with the UE.

18 Claims, 4 Drawing Sheets

(52) U.S. Cl.
CPC ......... *H04B 7/0628* (2013.01); *H04B 7/0695* (2013.01); *H04W 72/046* (2013.01)

(56) References Cited

U.S. PATENT DOCUMENTS

| | | |
|---|---|---|
| 2013/0272263 A1 | 10/2013 | Pi et al. |
| 2015/0341105 A1 | 11/2015 | Yu et al. |
| 2016/0165458 A1 | 6/2016 | Peng et al. |
| 2016/0345216 A1* | 11/2016 | Kishiyama ........ H04W 36/0083 |
| 2017/0094531 A1 | 3/2017 | Kakishima et al. |
| 2017/0104517 A1 | 4/2017 | Kakishima et al. |
| 2018/0097552 A1 | 4/2018 | Kakishima et al. |

FOREIGN PATENT DOCUMENTS

| | | |
|---|---|---|
| CN | 102484310 A | 5/2012 |
| CN | 104412638 A | 3/2015 |
| EP | 3122094 A1 | 1/2017 |
| WO | 2015141065 A1 | 9/2015 |
| WO | 2015141066 A1 | 9/2015 |

* cited by examiner

COMMUNICATION BEAM DETERMINING METHOD AND CORRESPONDING APPARATUS

CROSS-REFERENCE TO RELATED APPLICATIONS

This application is a continuation of International Application No. PCT/CN2016/104149, filed on Oct. 31, 2016, which claims priority to Chinese Patent Application No. 201510860704.0, filed on Nov. 30, 2015, which are hereby incorporated by reference in their entirety.

TECHNICAL FIELD

Embodiments of the invention relate to the field of communications and, in particular, to a communication beam determining method and corresponding apparatus.

BACKGROUND

A massive multiple-input multiple-output (Massive MIMO) technology is a latest development MIMO technology. Massive MIMO technology can help reduce inter-cell interference and thermal noise, thereby improving spectral efficiency and expanding system capacity.

Currently, Massive MIMO technology mainly has two types of implementations. One is a channel reciprocity-based beamforming (BF) implementation. In the implementation, a base station uses a wide beam to receive pilot information sent by user equipment (UE), and performs precoding weighting on transmit data of different UEs based on channel responses of the UEs. However, this implementation requires that a physical beam corresponding to each channel be a wide beam. This implementation can be applied to a Time Division Duplex (TDD) system in which UE moves slowly.

The other implementation is a narrow beam-based BF technology. In this implementation, a physical beam corresponding to each channel is a narrow beam (that is, widths of physical beams in a horizontal direction and a vertical direction are only a few degrees), and each narrow beam corresponds to specific user equipment, and a BF weighted value of transmit data is obtained based on a predefined weighted value or a weighted value that changes slowly.

Unlike the channel reciprocity-based BF implementation, the narrow beam-based BF implementation can be applied to both the TDD system and a Frequency Division Duplex (FDD) system, and has a wide application range, and is a promising to Massive MIMO technology. Conventionally, the narrow beam-based BF implementation specifically uses a narrow beam traverse scanning method to determine a beam for data transmission, that is, the base station divides a spatial channel into K narrow beams, and successively transmits a scanning signal by using each narrow beam, and determines the beam for data transmission based on a scanning result fed back by UE. A quantity k of narrow beams is proportional to a quantity of antennas, and there is an extremely large quantity of antennas for the Massive MIMO technology. Consequently, the foregoing narrow beam traverse scanning method consumes extensive time, and results in large overhead.

SUMMARY

Embodiments and examples of the present invention provide a communication beam determining method and a corresponding apparatus to improve on the narrow beam traverse scanning method to determine a communication beam, which can cause long time consumption in determining the beam and large overhead.

According to one embodiment, a communication beam determining method includes respectively sending, by a network side device, downlink sounding signals by using M beams with a first width, where main lobe directions of any two of the M beams with the first width are different, and M is an integer and not less than 2; receiving, by the network side device, sounding results of the downlink sounding signals that are returned by user equipment UE, and determining N beams with a second width based on the sounding results, where main lobe directions of any two of the N beams with the second width are different, the second width is less than the first width, a coverage area of a set of the N beams with the second width is smaller than a coverage area of a set of the M beams with the first width, and N is not less than 2; and respectively sending, by the network side device, downlink scanning signals by using the N beams with the second width, and determining, based on scanning results that are of the downlink scanning signals and that are returned by the UE, a first beam for data transmission with the UE.

In the foregoing examples and embodiments, the network side device first scans a spatial channel by using a wider beam, to determine an approximate spatial area (the coverage area of the N beams with the second width) in which the UE is located, and then scans the determined approximate area by using a narrower beam, so as to determine a narrow beam for communication with the UE based on the scanning results. The following examples and embodiments can significantly reduce channel scanning time, reduce overheads, and improve system efficiency in contrast to scanning a whole spatial channel in a traversal manner by using a narrow beam.

According to one embodiment, after the network side device determines the first beam, a method further includes obtaining, by the network side device, channel change information of the UE, where the channel change information may be information characterizing a spatial characteristic direction of a channel, or geographical location information of the UE; generating, by the network side device, at least two tracking beams based on the channel change information and the first beam; and respectively sending, by the network side device, downlink tracking signals by using the at least two tracking beams, and updating, based on tracking results that are of the downlink tracking signals and that are returned by the UE, the beam for data transmission with the UE.

In the foregoing examples and embodiments, the network side device can obtain the channel change information, and track and scan the UE based on the channel change information and the beam for current communication, and update the beam for communication with the UE based on the tracking results returned by the UE, to update the communication beam in real time, so that the communication beam conforms to the movement status of the UE, and it is ensured that communication between the UE and the network side device is in a relatively good state.

According to one example, sounding results can include largest received signal strength information of the downlink sounding signals; and determining, by the network side device, the N beams with the second width based on the sounding results includes determining, by the network side device, a second beam that is in the M beams with the first width and that is corresponding to largest received signal strength of the downlink sounding signals; and determining, by the network side device, the N beams with the second width based on the second beam, where the coverage area of the set of the N beams with the second width is corresponding to a coverage area of the second beam.

In the foregoing examples and embodiments, the network side device directly determines, based on the beam with the first width whose received signal strength is largest, the N beams with the second width for performing scanning. This is easy to be implemented and has a small calculation amount.

According to one embodiment, scanning results can include received signal strength information of the downlink scanning signals; and the determining, by the network side device, the first beam based on the scanning results includes: determining, by the network side device, a beam that is in the N beams with the second width and that is corresponding to largest received signal strength of the downlink scanning signals, where the determined beam is the first beam.

An advantage of the following examples and embodiments is that the first beam is determined in a simple manner, and calculation processing is small.

According to one embodiment, scanning results can include received signal strength information of the downlink scanning signals; and the determining, by the network side device, the first beam based on the scanning results includes: updating, by the network side device, channel information based on received signal strength corresponding to each beam with the second width, and determining the first beam based on the channel information.

An advantage of the following examples and embodiments is that quality of communication between the network side device and the UE can be much improved.

According to one embodiment, a communication beam determining method includes receiving, by UE, at least one of downlink sounding signals that are sent by a network side device by using M beams with a first width, where M is not less than 2; returning, by the UE, a sounding result of the at least one downlink sounding signal to the network side device, where the sounding result is used by the network side device to determine N beams with a second width, the second width is less than the first width, a coverage area of a set of the N beams with the second width is smaller than a coverage area of a set of the M beams with the first width, and N is an integer and not less than 2; receiving, by the UE, downlink scanning signals respectively sent by the network side device by using the N beams with the second width; and returning, by the UE, scanning results of the downlink scanning signals to the network side device, where the scanning results are used by the network side device to determine a first beam for data transmission with the UE.

According to one embodiment, a method includes receiving, by the UE, downlink tracking signals respectively sent by the network side device by using at least two tracking beams, where the at least two tracking beams are generated by the network side device based on channel change information and the first beam; and returning, by the UE, tracking results of the downlink tracking signals to the network side device, where the tracking results are used by the network side device to update the beam for data transmission with the UE.

According to one embodiment a communication beam determining apparatus includes a sending module, configured to respectively send downlink sounding signals by using M beams with a first width, where main lobe directions of any two of the M beams with the first width are different, and M is an integer not less than 2; a receiving module, configured to receive sounding results that are of the downlink sounding signals and that are returned by user equipment UE; and a processing module, configured to determine N beams with a second width based on the sounding results, where the second width is less than the first width, a coverage area of a set of the N beams with the second width is smaller than a coverage area of a set of the M beams with the first width, and N is an integer and not less than 2, where the sending module is further configured to respectively send downlink scanning signals by using the N beams with the second width; the receiving module is further configured to receive scanning results that are of the downlink scanning signals and that are returned by the UE; and the processing module is configured to determine a first beam for data transmission with the UE based on the scanning results.

According to one embodiment, the processing module is configured to obtain channel change information of the UE; and generate at least two tracking beams based on the channel change information and the first beam; the sending module is further configured to respectively send downlink tracking signals by using the at least two tracking beams; the receiving module is further configured to receive tracking results that are of the downlink tracking signals and that are returned by the UE; and the processing module is further configured to update the beam for data transmission with the UE based on the tracking results returned by the UE.

According to one example, sounding results can include information indicating largest received signal strength of the UE for the downlink sounding signals; and the processing module is specifically configured to: determine a second beam that is in the M beams with the first width and that is corresponding to largest received signal strength of the downlink sounding signals; and determine the N beams with the second width based on the second beam, where the coverage area of the set of the N beams with the second width is corresponding to a coverage area of the second beam.

According to one embodiment, scanning results can include received signal strength information of the downlink scanning signals; and the processing module is specifically configured to determine a beam that is in the N beams with the second width and that is corresponding to largest received signal strength of the downlink scanning signals, where the determined beam is the first beam.

According to one embodiment, scanning results can include received signal strength information of the downlink scanning signals; and the processing module is specifically configured to: update channel information based on received signal strength corresponding to each beam with the second width, and determine the first beam based on the channel information.

According to one embodiment, a communication beam determining apparatus includes a receiving module, configured to receive at least one of downlink sounding signals that are sent by a network side device by using M beams with a first width, where M is an integer and not less than 2; a processing module, configured to generate a sounding result of the at least one downlink sounding signal; and a sending module, configured to return the sounding result to the network side device, where the sounding result is used by the network side device to determine N beams with a second width, the second width is less than the first width, a coverage area of a set of the N beams with the second width is smaller than a coverage area of a set of the M beams with the first width, and N is an integer and not less than 2; where the receiving module is further configured to receive downlink scanning signals respectively sent by the network side device by using the N beams with the second width; the processing module is further configured to generate scanning results of the downlink scanning signals; and the sending module is further configured to return the scanning results to the network side device, where the scanning results are used by the network side device to determine a first beam for data transmission with the apparatus.

According to one embodiment, the receiving module is configured to receive downlink tracking signals respectively sent by the network side device by using at least two tracking beams, where the at least two tracking beams are generated by the network side device based on channel change information and the first beam; the processing module is further configured to generate tracking results of the downlink tracking signals; and the sending module is further configured to return the tracking results to the network side device, where the tracking results are used by the network side device to update the beam for data transmission with the apparatus.

According to one embodiment, a communication beam determining device includes a transceiver, configured to communicate with UE; a memory, configured to store an instruction; and a processor, separately connected to the transceiver and the processor, and configured to execute the instruction stored in the memory, so as to perform the following steps: instructing the transceiver to respectively send downlink sounding signals by using M beams with a first width, where main lobe directions of any two of the M beams with the first width are different, and M is an integer and not less than 2; instructing the transceiver to receive sounding results that are of the downlink sounding signals and that are returned by the user equipment UE; determining N beams with a second width based on the sounding results, where the second width is less than the first width, a coverage area of a set of the N beams with the second width is smaller than a coverage area of a set of the M beams with the first width, and N is an integer and not less than 2; instructing the transceiver to respectively send downlink scanning signals by using the N beams with the second width; and determining a first beam for data transmission with the UE based on scanning results that are of the downlink scanning signals and that are returned by the UE.

According to one embodiment, after determining the first beam for data transmission with the UE based on the scanning results returned by the UE, the processor is configured to obtain channel change information of the UE; generate at least two tracking beams based on the channel change information and the first beam; and respectively send downlink tracking signals by using the at least two tracking beams, and update, based on tracking results returned by the UE, the beam for the data transmission with the UE.

According to one embodiment, sounding results can include largest received signal strength information of the downlink sounding signals; and that the processor is configured to determine the N beams with the second width based on the sounding results is specifically: determining a second beam that is in the M beams with the first width and that is corresponding to largest received signal strength of the downlink sounding signals; and determining the N beams with the second width based on the second beam, where the coverage area of the set of the N beams with the second width is corresponding to a coverage area of the second beam.

According to one embodiment, scanning results can include received signal strength information of the downlink scanning signals. A processor can be configured to determine a first beam for data transmission with the UE based on scanning results returned by the UE. Specifically, the processor can determine a beam that is in the N beams with the second width and that is corresponding to largest received signal strength of the downlink scanning signals, where the determined beam is the first beam.

According to one embodiment, scanning results can include received signal strength information of the downlink scanning signals; and that the processor is configured to determine a first beam for data transmission with the UE based on scanning results returned by the UE is specifically: updating channel information based on received signal strength corresponding to each beam with the second width, and determine the first beam based on the channel information.

According to one embodiment, a communication beam determining device includes a transceiver, configured to communicate with a network side device; a memory, configured to store an instruction; and a processor, separately connected to the transceiver and the processor, and configured to execute the instruction stored in the memory, so as to perform the following steps: receiving at least one downlink sounding signal sent by the network side device by using M beams with a first width, where M is an integer and not less than 2; returning a sounding result of the at least one downlink sounding signal to the network side device, where the sounding result is used by the network side device to determine N beams with a second width, the second width is less than the first width, a coverage area of a set of the N beams with the second width is smaller than a coverage area of a set of the M beams with the first width, and N is an integer and not less than 2; receiving downlink scanning signals respectively sent by the network side device by using the N beams with the second width; and returning scanning results of the downlink scanning signals to the network side device, where the scanning results are used by the network side device to determine a first beam for data transmission with the communication beam determining device.

According to one embodiment, the processor is configured to instruct the transceiver to receive downlink tracking signals respectively sent by the network side device by using at least two tracking beams, where the at least two tracking beams are generated by the network side device based on channel change information and the first beam; and instruct the transceiver to return tracking results of the downlink tracking signals to the network side device, where the tracking results are used by the network side device to update the beam for data transmission with the communication beam determining device.

In some embodiments, sounding results can include received signal strength information of the downlink sounding signals. In some embodiments, scanning results can include received signal strength information of the downlink scanning signals.

BRIEF DESCRIPTION OF DRAWINGS

The following examples and embodiments will be described with respect to the following figures, in which.

DESCRIPTION OF EXAMPLES AND EMBODIMENTS

The following examples and embodiments are described in detail with reference to the accompanying drawings. The specific features and details in the examples and embodiments are exemplary and not intended to be limiting.

The following examples and embodiments may be applied to various communications systems, such as: a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, a Universal Mobile Telecommunication System (UMTS), and a $5^{th}$ Generation Communication System (5G).

User equipment UE may also be referred to as a mobile terminal (MT), mobile user equipment, and the like, and may communicate with one or more core networks by using a radio access network (RAN). The user equipment may be a mobile terminal such as a mobile phone (or referred to as a "cellular" phone), and a computer that has a mobile terminal. For example, the user equipment may be a portable, pocket-size, handheld, computer-integrated or in-vehicle mobile apparatus, which exchanges voice and/or data with the radio access network.

A network side device may be a base station in a mobile communications network, or may be a wireless access point (AP) in a wireless local area network. The base station may be a base transceiver station (BTS) in the GSM or the CDMA, or may be a NodeB (NodeB) in the WCDMA, or may be an evolved NodeB (eNB or e-NodeB) in the LTE.

It should be noted that the technical solutions provided in the disclosed examples and embodiments can be applied to any field such as the Massive MIMO field, and any other related field.

Example 1

Figure 1:
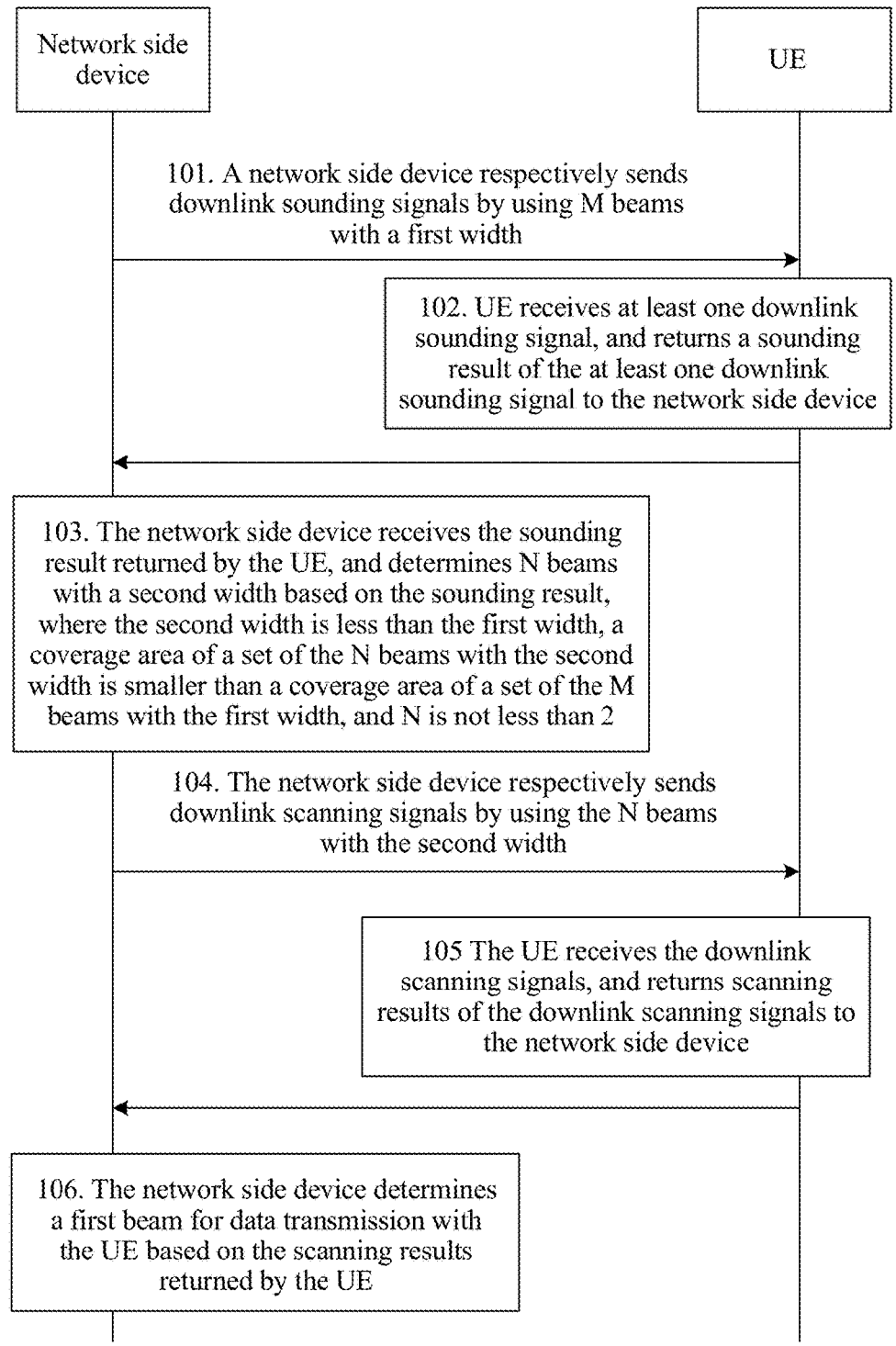
FIG. 1 is a schematic flowchart of a communication beam determining method according to one embodiment.

FIG. 1 is a schematic flowchart of a beam determining method according to one embodiment. For this example, the method can include the following steps.

Step 101: A network side device respectively sends downlink sounding signals by using M beams with a first width, where main lobe directions of any two of the M beams with the first width are different, and M is an integer and not less than 2.

Step 102: UE receives at least one downlink sounding signal, and returns a sounding result of the at least one downlink sounding signal to the network side device.

Step 103: The network side device receives the sounding result returned by the UE, and determines N beams with a second width based on the sounding result, where the second width is less than the first width, a coverage area of a set of the N beams with the second width is smaller than a coverage area of a set of the M beams with the first width, and N is an integer and not less than 2.

Step 104: The network side device respectively sends downlink scanning signals by using the N beams with the second width.

Step 105: The UE receives the downlink scanning signals, and returns scanning results of the downlink scanning signals to the network side device.

Step 106: The network side device determines a first beam for data transmission with the UE based on the scanning results returned by the UE.

Specifically, the network side device first divides a spatial channel into the M beams with the first width, and sends the downlink sounding signal by using each beam with the first width. It may be understood that the set of the M beams with the first width can cover a cell to which the UE belongs.

The UE receives one or more of the M downlink sounding signals, and returns the sounding result to the network side device. The network side device determines the N beams with the second width based on the sounding result returned by the UE, and then performs scanning by using the N beams with the second width. The UE returns, to the network side device, the scanning results of the downlink scanning signals sent by using the N beams with the second width. The network side device determines the first beam for communication with the UE based on the scanning results. The coverage area of the set of the N beams with the second width is smaller than the coverage area of the set of the M beams with the first width.

In the foregoing examples and embodiments, the network side device first can scan the spatial channel by using a wider beam, to determine an approximate spatial area in which the UE is located, and then can scan the determined approximate area by using a narrower beam, so as to determine a narrow beam for communication with the UE based on the scanning results. Such examples and embodiments can significantly reduce channel scanning time, reduce overheads, and improve system efficiency over scanning a whole spatial channel in a traversal manner by using a narrow beam.

Figure 2:
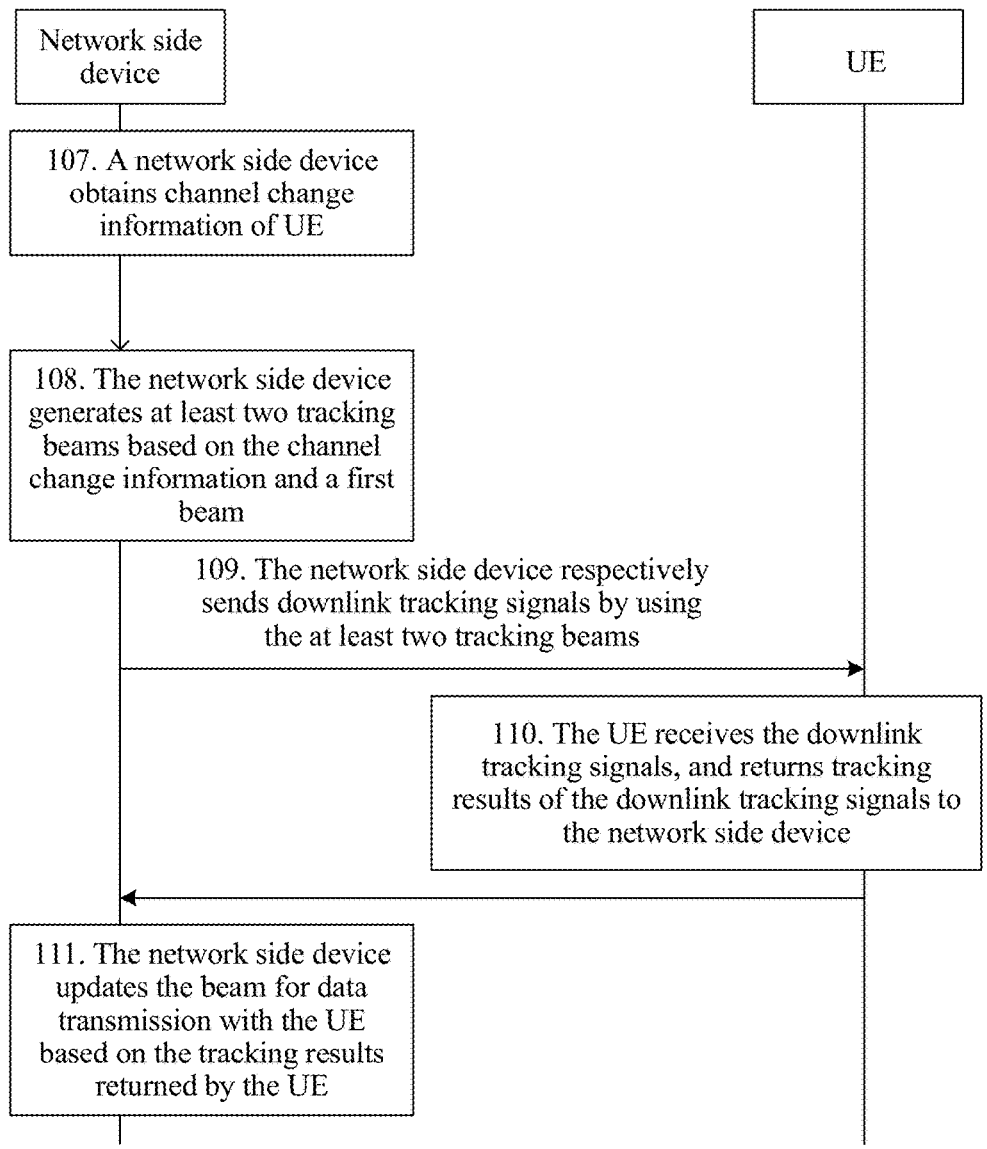
FIG. 2 is a further detailed schematic flowchart of a communication beam determining method according to one embodiment.
Figure 3A:
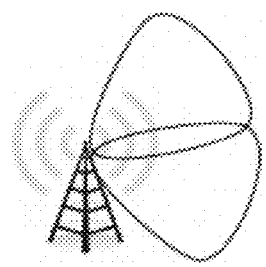
FIG. 3a to FIG. 3d are respectively schematic diagrams in which a network side device sounds UE, scans UE, performs data transmission with UE, and tracks and updates a channel according to one embodiment.
Figure 3B:
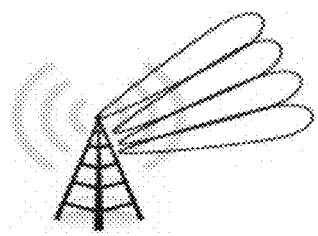
Figure 3C:
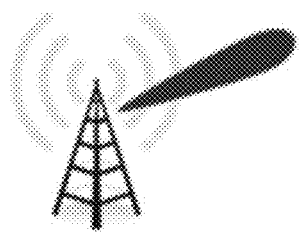
Figure 3D:
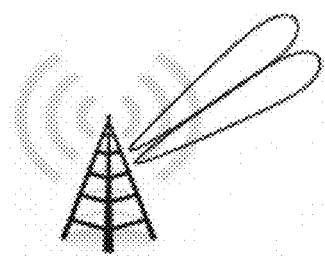

Optionally, according to one embodiment, referring to FIG. 2, after step 106, the method can include the following steps.

Step 107: The network side device obtains channel change information of the UE.

Step 108: The network side device generates at least two tracking beams based on the channel change information and the first beam.

Step 109: The network side device respectively sends downlink tracking signals by using the at least two tracking beams.

Step 110: The UE receives the downlink tracking signals, and returns tracking results of the downlink tracking signals to the network side device.

Step 111: The network side device updates the beam for data transmission with the UE based on the tracking results returned by the UE.

Specifically, after the network side device determines the first beam for communication with the UE, data transmission between the network side device and the UE is implemented by using the first beam. In a process of communication between the network side device and the UE, the channel change information of the UE is obtained. The channel change information may be reported by the UE to the network side device (for example, the UE reports geographical location information of the UE), or the channel change information may be determined by the network side device based on an uplink signal sent by the UE. For example, the network side device determines, based on a receive power value fed back by the UE, information used to characterize a spatial characteristic direction.

After obtaining the channel change information, the network side device predicates, with reference to the channel change information and the first beam for current communication with the UE, a spatial channel area in which the UE is subsequently located, and generates the at least two tracking beams. A set of the at least two tracking beams conforms to a channel change tendency (that is, conforms to a movement status of the UE), and a coverage area of the set of the at least two tracking beams is the predicated spatial channel area in which the UE is located. Then the downlink tracking signals are respectively sent by using the at least two tracking beams, and the beam for communication with the user is updated based on the tracking results fed back by the user.

It should be noted that the downlink sounding signals, the downlink scanning signals, and the downlink tracking signals in this embodiment can all be signals for scanning the UE. A difference can be that beam sets of the downlink sounding signals, the downlink scanning signals, and the downlink tracking signals are different, and beam identifiers carried by the downlink sounding signals, the downlink scanning signals, and the downlink tracking signals are different.

In the foregoing examples and embodiments, the network side device can obtain the channel change information, and track and scan the UE based on the channel change information and the beam for current communication, and update the beam for communication with the UE based on the tracking results returned by the UE, to update the communication beam in real time, so that the communication beam conforms to the movement status of the UE, and it is ensured that communication between the UE and the network side device is always in a relatively good state.

Optionally, in one embodiment, step 103 in which the network side device receives the sounding result returned by the UE, and determines the N beams with the second width based on the sounding result can have further implement:

(Implementation 1): The sounding result returned by the UE includes largest received signal strength information of the downlink sounding signal. The network side device determines a second beam that is in the M beams with the first width and that is corresponding to largest received signal strength, and determines the N beams with the second width based on the second beam. The coverage area of the set of N beams with the second width is corresponding to a coverage area of the second beam.

When the first width is large enough, the UE can receive only one downlink sounding signal sent by using the beam with the first width, and the UE may return an identifier of the beam to the network side device (the identifier may be obtained from the downlink sounding signal). In this case, the network side device may determine that a beam corresponding to the identifier is the second beam.

If the second beam is not so wide that the UE can receive only one downlink sounding signal, that is, the UE receives two or more downlink sounding signals, the UE may return, to the network side device, an identifier of a beam corresponding to the largest received signal strength, or return received signal strength of each received downlink sounding signal to the network side device. In this case, the network side device can determine, based on the returned identifier of the beam corresponding to the largest received signal strength or the received signal strength of each received downlink sounding signal, that the beam with the first width that is corresponding to the largest received signal strength is the second beam. It may be understood that the received signal strength in this embodiment of the present invention includes but is not limited to downlink receive power.

The coverage area of the set of the N beams with the second width may be corresponding to the coverage area of the second beam in the following manners:

For one embodiment, channel space corresponding to the second beam is divided into the N beams with the second width, and the coverage area of the set of the N beams with the second width is equal to the coverage area of the second beam.

For another embodiment, the coverage area of the set of the N beams with the second width includes the coverage area of the second beam, and is slightly larger than the coverage area of the second beam. Such setting can ensure that the set of the N beams with the second width can definitely cover the UE.

For another embodiment, the coverage area of the second beam includes the coverage area of the set of the N beams with the second width, and is slightly larger than the coverage area of the set of the N beams with the second width. The previously determined second beam is the beam corresponding to the largest received signal strength for the UE, and therefore, usually the UE is not located at a side edge of the coverage area of the second beam. The coverage area of the set of the N beams with the second width is set to be appropriately less than the coverage area of the second beam, so that a scanning area can be narrowed when the UE is covered, thereby reducing a scanning time and improving efficiency.

For another embodiment, the coverage area of the set of the N beams with the second width intersects with the coverage area of the second beam, but neither of them includes the other. A purpose of such setting is considering both a requirement for covering the UE and a requirement for narrowing a scanning area, that is, if the UE can infer, based on the sounding result fed back by the UE, that the UE is closer to one side of the coverage area of the second beam, the coverage area of the set of the N beams with the second width may be expanded toward the side that is closer to the UE in the coverage area of the second beam, and a coverage area on the other side may be slightly narrowed.

The following techniques allow for the coverage area of the set of the N beams with the second width to correspond to the coverage area of the second beam. For one embodiment, the two coverage areas can be approximately equal and, in other embodiments, the two coverage areas can be equal, or one coverage area includes the other coverage area. For one embodiment, setting the coverage area of set of the N beams with the second width is a requirement that ensures that the UE is covered. Optionally, the coverage area of the set of the N beams with the second width may be expanded or narrowed based on the coverage area of the second beam.

(Implementation 2): The UE receives downlink sounding signals sent by using r beams in the M beams with the first width, and feeds back received signal strength corresponding to the r beams to the network side device; and the network side device determines the N beams with the second width based on the received signal strength corresponding to the r beams and respective BF weighted values of the r beams.

Optionally, for one embodiment, the scanning results returned by the UE to the network side device include received signal strength information of the downlink scanning signals. Received signal strength may be represented by using downlink receive power of the UE, or may be represented by using another physical quantity that can characterize received signal strength, and details are not described herein.

That the network side device determines a first beam for data transmission with the UE based on the scanning results returned by the UE can further implement:

(Implementation 1): The network side device determines a beam that is in the N beams with the second width and that is corresponding to largest received signal strength of the downlink scanning signals, and uses the beam as the first beam.

Optionally, when determining that the largest received signal strength of the N beams with the second width that is returned by the UE reaches a threshold, the network side device determines that the beam corresponding to the largest received signal strength is the first beam. That is, if the largest received signal strength meets a communication requirement, the beam corresponding to the largest received signal strength is directly used as a communication beam (that is, the first beam).

An advantage of this implementation is that it is simple, and a calculation amount is small.

(Implementation 2): The network side device does not directly select an optimal beam from the N beams with the second width as the first beam for communication, but updates channel information based on received signal strength corresponding to each beam with a second width, and determines the first beam based on the channel information.

Specifically, scanning results fed back by the UE include an angular domain energy matrix $H_{angular}$ of the N beams with the second width that is constructed when the UE receives the downlink scanning signals. A spatial channel matrix $H_{space}$ is determined based on $H_{angular}$, and a BF weighted value of the first beam may be determined based on $H_{space}$, so as to form the first beam; where $$H_{Space} = H_{Angular} \times U^H \text{ s.t } U \times U^H = I$$

$$U = \left[\varepsilon(0), \varepsilon\left(\frac{1}{N_{tx}}\right), \ldots, \varepsilon\left(\frac{N_{tx}-1}{N_{tx}}\right)\right]$$

$$\varepsilon(n) = \begin{bmatrix} 1 \\ \exp(-j2\pi n) \\ \ldots \\ \exp(-j2\pi n(N_{tx}-1)) \end{bmatrix},$$

where $N_{tx}$ in the above equation is a quantity of antennas; $H_{space}$ may be determined based on the foregoing expression equation; and for a manner of determining the BF weighted value of the first beam based on $H_{space}$, refer to the prior art.

Optionally, when determining that the largest received signal strength of the N beams with the second width that is returned by the UE is less than a threshold, the network side device updates the channel information in the foregoing Manner 2 based on received signal strength corresponding to each beam with the second width that is returned by the UE, and determines the first beam based on the channel information.

An advantage of this implementation is improved quality of communication between the network side device and the UE.

Optionally, for one embodiment, before step 101 in which a network side device respectively sends downlink sounding signals by using M beams with a first width, the method further includes detecting, by the network side device, UE that newly accesses a network.

Specifically, after detecting the UE that newly accesses the network, the network side device determines a beam for communication with the UE by using the above described step 101 to step 106.

Optionally, for one embodiment, when respectively sending the downlink sounding signals by using the M beams with the first width, the network side device may successively send a downlink sounding signal on each beam; or may send downlink sounding signals on s beams at a time, and all the downlink sounding signals are sent at M/s times. If M cannot be divisible by s, all the downlink sounding signals are sent at Int([M/s]+1) times. Int(*) is a rounding operator.

Optionally, for one embodiment, when respectively sending the downlink scanning signals by using the N beams with the second width, the network side device may successively send a downlink scanning signal on each beam, or may send downlink scanning signals on t beams at a time.

FIG. 3a to FIG. 3d respectively show schematic diagrams of four stages of a network side device: sounding, scanning, data transmission, and channel tracking. The following gives description by using specific embodiments.

First, when detecting that UE is a device that newly accesses a network, a base station performs sounding on the UE, so as to learn an approximate channel area in which the UE is located. A specific implementation is: The base station determines a BF weighted value $V_d$ corresponding to each of $N_d$ downlink sounding signals $T_d$ (that is, generates $N_d$ beams with a first width). $V_d$ may be a discrete Fourier transform (discrete Fourier transform, DFT for short) vector, or a linear combination of a plurality of DFT vectors, or another BF weighted value that can cover a cell in which the UE is located.

The base station can send a sounding signal $T_d$ on which weighting is performed by using $V_d$ may be expressed as follows:

$X_d = V_d T_d = [v_1^d v_2^d \ldots v_{RF}^d][T_{d1} T_{d2} \ldots T_{dRF}]^T$, and in the equation, RF is a quantity of antennas.

The UE can receive a downlink sounding signal may be expressed as follows:

$Y = H V_d T_d + N_0$ $S = Y T_d^H = H V_d + \theta$, where

Y characterizes a signal received by the UE, H characterizes a channel between the base station and the UE, $N_0$ is Gaussian noise, S is signal processed by the UE, $\theta$ is residual interference, a modulo operation value of S may characterize received signal strength, and the UE feeds back received signal strength for a beam corresponding to strength that exceeds a threshold to the base station.

The base station can construct a first characteristic matrix based on an identifier fed back by the UE:

$$R_D = \sum_j V_j^d (V_j^d)^H \cdot P_j,$$

where $R_D$ is the first characteristic matrix, $V_j^d$ is a BF weighted value of a $j^{th}$ sounding beam, and $P_j$ is received signal strength corresponding to the $j^{th}$ sounding beam.

The base station can determine BF weighted values $V_s$ of $N_s$ scanning beams based on the characteristic matrix $R_D$, a value range of s is from 1 to $N_s$, $r=\text{diag}(U^H R_D U)$, and r is a set of V1 to $V_{Ns}$. U is a DFT matrix, and an expression equation of DFT is: DFT=FFT (eye (RF)), FFT is a fast Fourier transformation (FFT for short) operation, and eye (RF) is an operation for generating an RF×RF identity matrix.

The base station can send a scanning signal $T_s$ on which weighting is performed by using $V_s$, so as to send scanning signals by using $N_S$ beams with a second width, and the scanning signal may be expressed as follows: $X_s = V_s T_s = [v_1^s\ v_2^s\ \ldots\ v_{RF}^s][T_{s1}\ T_{s2}\ \ldots\ T_{sRF}]^T$.

The UE can receive the scanning signal, which can be expressed as follows:

$$Y = HV_s T_s + N_0$$

$$S = YT_s^H = HV_s + \theta$$

The detected received signal strength of each scanning signal is fed back to the UE.

For one embodiment, the base station directly determines that a BF weighted value of a scanning signal corresponding to largest signal receiving strength is a BF weighted value of a first beam used for communication.

In another embodiment, the base station constructs a second characteristic matrix R based on the received signal strength fed back by the UE, and R is expressed as follows:

$$\hat{W} = \sum_j s_j v_j^s (v_j^s)^H$$

$$R = \hat{W}$$

The base station can then determine a BF weighted value of a first beam based on a second-order channel characteristic vector direction, that is:

the base station determines that the weighted value of the first beam is $V_j$ that meets Max $(V_j^H R V_j)$, and $V_j$ belongs to a DFT vector.

The network side device can then perform data transmission with the UE based on the determined first beam.

Further, in the process of performing data transmission with the UE based on the first beam, the network side device tracks and updates a communication beam. A process of tracking and updating the communication beam is the same as the foregoing scanning stage. The only difference is that when constructing the second characteristic matrix, in addition to a newly obtained characteristic matrix $\hat{W}$, the base station may need to use previously obtained characteristic matrix information, which is expressed as follows:

$$\hat{W} = \sum_j s_j v_j v_j^H, \quad R = (1-a)R + a\hat{W},$$

where

α is a filtering coefficient.

Example 2

Figure 4:
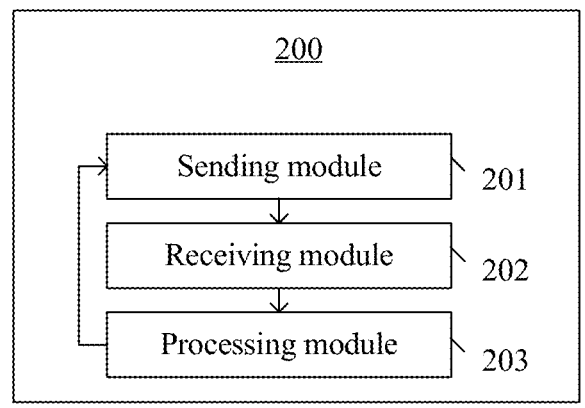
FIG. 4 is a schematic structural block diagram of a communication beam determining apparatus according to one embodiment.

Based on a same technical concept, for one embodiment, a communication beam determining apparatus 200 is shown in FIG. 4. Referring to FIG. 4, the apparatus 200 includes sending module 201, receiving module 202, and a processing module 203. The sending module 201 is configured to respectively send downlink sounding signals by using M beams with a first width, where main lobe directions of any two of the M beams with the first width are different, and M is not less than 2. The receiving module 202 is configured to receive sounding results that are of the downlink sounding signals that are returned by user equipment UE. The processing module 203 is configured to determine N beams with a second width based on the sounding results, where the second width is less than the first width, a coverage area of a set of the N beams with the second width is smaller than a coverage area of a set of the M beams with the first width, and N is not less than 2.\

The sending module 201 is further configured to respectively send downlink scanning signals by using the N beams with the second width. The receiving module 202 is further configured to receive scanning results that are of the downlink scanning signals and that are returned by the UE. The processing module 203 is further configured to determine a first beam for data transmission with the UE based on the scanning results.

Optionally, for one embodiment, the processing module 203 is further configured to obtain change information of the UE, and generate at least two tracking beams based on the channel change information and the first beam. The sending module 201 is further configured to respectively send downlink tracking signals by using the at least two tracking beams. The receiving module 202 is further configured to receive tracking results that are of the downlink tracking signals and that are returned by the UE. The processing module 203 is further configured to update the beam for data transmission with the UE based on the tracking results returned by the UE.

Optionally, for one embodiment, the sounding results include largest received signal strength information of the downlink sounding signals. The processing module 203 is specifically configured to determine a second beam that is in the M beams with the first width and that is corresponding to largest received signal strength of the downlink sounding signals, and to determine the N beams with the second width based on the second beam, where the coverage area of the set of the N beams with the second width is corresponding to a coverage area of the second beam.

Optionally, for one embodiment, the scanning results include received signal strength information of the downlink scanning signals. The processing module 203 is specifically configured to determine a beam that is in the N beams with the second width and that is corresponding to largest received signal strength of the downlink scanning signals, where the determined beam is the first beam.

Optionally, for one embodiment, the scanning results include received signal strength information of the downlink scanning signals. The processing module 203 is specifically configured to: update channel information based on received signal strength corresponding to each beam with the second width, and determine the first beam based on the channel information.

For one embodiment, the sending module 201 may be a transmitter, and the receiving module 202 may be a receiver, and the processing module 203 may be a processor. In addition, the sending module 201 and the receiving module 202 may be integrated together.

The apparatus 200 in this embodiment and the communication beam determining method in Example 1 can be two aspects based on same techniques disclosed herein. For conciseness of this specification, the above details are not described again for the following examples.

Example 3

For one embodiment, a communication beam determining apparatus includes a receiving module, processing module, and a sending module. The receiving module is configured to receive a downlink sounding signal sent by a network side device by using a beam with a first width. The processing module is configured to generate a sounding result of the downlink sounding signal. The sending module is configured to return the sounding result to the network side device, where the sounding result is used by the network side device to determine N beams with a second width, and N is an integer and not less than The receiving module is further configured to receive downlink scanning signals respectively sent by the network side device by using the N beams with the second width. The processing module is further configured to generate scanning results of the downlink scanning signals. The sending module is further configured to return the scanning results to the network side device, where the scanning results are used by the network side device to determine a first beam for data transmission with the communication beam determining apparatus.

Optionally, for one embodiment, the receiving module is further configured to receive downlink tracking signals respectively sent by the network side device by using at least two tracking beams. The processing module is further configured to generate tracking results of the downlink tracking signals. The sending module is further configured to return the tracking results to the network side device, where the tracking results are used by the network side device to update the beam for data transmission with the communication beam determining apparatus.

Optionally, for one embodiment, sounding results can include received signal strength information of the downlink sounding signal.

Optionally, for one embodiment, scanning results can include received signal strength information of each of the N downlink scanning signals.

The communication beam determining apparatus in Example 3 and the communication beam determining method in Example 1 can be two aspects based on same techniques disclosed herein. For conciseness, the same details are not described again for the following examples.

Example 4

Figure 5:
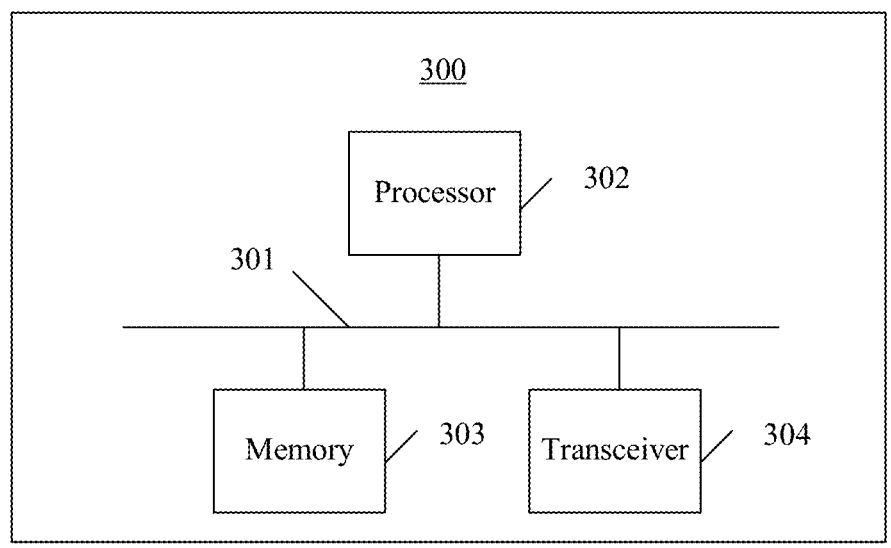
FIG. 5 is a schematic structural block diagram of a communication beam determining device according to one embodiment.

For one embodiment, a communication beam determining device 300 is shown in FIG. 5. Referring to FIG. 5, the device 300 includes a bus 301, and a processor 302, a memory 303, and a transceiver 304 that are separately connected to the bus 301.

The transceiver 304 is configured to communicate with UE. The memory 303 is configured to store an instruction. The processor 302 is configured to execute the instruction stored in the memory 303, so as to instruct the transceiver 304 to respectively send downlink sounding signals by using M beams with a first width, where main lobe directions of any two of the M beams with the first width are different, and M is not less than 2. The processor 302 instructs the transceiver 304 to receive sounding results that are of the downlink sounding signals and that are returned by the user equipment UE. The processor 302 determines N beams with a second width based on the sounding results, where the second width is less than the first width, a coverage area of a set of the N beams with the second width is smaller than a coverage area of a set of the M beams with the first width, and N is not less than 2. The processor 302 instructs the transceiver 304 to respectively send downlink scanning signals by using the N beams with the second width. The processor 302 also determines a first beam for data transmission with the UE based on scanning results that are of the downlink scanning signals and that are returned by the UE.

Optionally, for one embodiment, the processor 302 is further configured to obtain channel change information of the UE. The processor 302 can also generate at least two tracking beams based on the channel change information and the first beam. The processor 302 can send downlink tracking signals by using the at least two tracking beams, and update, based on tracking results that are of the downlink tracking signals and that are returned by the UE, the beam for the data transmission with the UE.

Optionally, for one embodiment, sounding results include largest received signal strength information of the downlink sounding signals. The processor 302 is configured to determine N beams with a second width based on the sounding results and determines a second beam that is in the M beams with the first width and corresponds to a largest received signal strength of the downlink sounding signal. The processor 302 determines the N beams with the second width based on the second beam, where the coverage area of the set of the N beams with the second width is corresponding to a coverage area of the second beam.

Optionally, for one embodiment, scanning results include received signal strength information of the downlink scanning signals. The processor 302 is configured to determine a first beam for data transmission with the UE based on scanning results that are of the downlink scanning signals and that are returned by the UE can determine a beam that is in the N beams with the second width and that is corresponding to largest received signal strength of the downlink scanning signals, where the determined beam is the first beam.

Optionally, for one embodiment, scanning results include received signal strength information of the downlink scanning signals. The processor 302 is configured to determine a first beam for data transmission with the UE based on scanning results that are of the downlink scanning signals and that are returned by the UE and updates channel information based on received signal strength corresponding to each beam with the second width, and determining the first beam based on the channel information.

Optionally, for one embodiment, the transceiver 304 further includes one or more antennas, and a beam is formed by performing weighting on the antennas.

The device 300 in Example 4 and the communication beam determining method in Example 1 are two aspects based on same techniques disclosed herein. For conciseness, the same details are not described herein again for the following examples.

Example 5

For one embodiment, a communication beam determining device includes a bus, and a processor, a memory, and a transceiver that are separately connected to the bus.

The transceiver is configured to communicate with a network side device. The memory is configured to store instructions.

The processor is configured to execute the instructions stored in the memory 303 and to receive at least one downlink sounding signal sent by the network side device by using M beams with a first width, where M is an integer and not less than 2. The processor can return a sounding result of the at least one downlink sounding signal to the network side device, where the sounding result is used by the network side device to determine N beams with a second width, the second width is less than the first width, a coverage area of a set of the N beams with the second width is smaller than a coverage area of a set of the M beams with the first width, and N is an integer not less than 2. The processor can receive downlink scanning signals respectively sent by the network side device by using the N beams with the second width. The processor can return scanning results of the downlink scanning signals to the network side device, where the scanning results are used by the network side device to determine a first beam for data transmission with the communication beam determining device.

Optionally, for one embodiment, the processor is further configured to instruct the transceiver to receive downlink tracking signals respectively sent by the network side device by using at least two tracking beams, where the at least two tracking beams are generated by the network side device based on channel change information and the first beam. The processor can instruct the transceiver to return the tracking results of the downlink tracking signals to the network side device, where tracking results are used by the network side device to update the beam for data transmission with communication beam determining device.

Optionally, for one embodiment, sounding results include received signal strength information of the downlink sounding signals.

Optionally, for one embodiment, scanning results include received signal strength information of each of the N downlink scanning signals.

The communication beam determining device for Example 5 and the communication beam determining method for Example 1 can be two aspects based on same techniques disclosed herein. It should be noted that the processor may be one processing unit, or may be a collective term of a plurality of processing units. For example, the processor may be a central processing unit (CPU for short), or may be an application specific integrated circuit (ASIC for short), or one or more integrated circuits configured to implement this embodiment of the present invention, for example, one or more microprocessors (DSP for short), or one or more field programmable gate arrays (FPGA for short).

The memory may be a storage apparatus, or may be a collective term of a plurality of storage elements, and is configured to store executable program code, or a parameter, data, or the like required by a user access network device or a terminal for running. In addition, the memory may include a random access memory (RAM for short), and may further include a non-volatile memory (NVM for short), for example, a magnetic disk memory or a flash memory (Flash).

The bus may be an industry standard architecture (ISA for short) bus, a peripheral component interconnect (PCI for short) bus, an extended industry standard architecture (EISA for short) bus, or the like. The bus may be classified into an address bus, a data bus, a control bus, and the like. For ease of representation, only one line is used in the figure for representation, but it does not indicate that there is only one bus or one type of bus.

For one embodiment, the network side device first scans a spatial channel by using a wider beam, to determine an approximate spatial area in which the UE is located, and then scans the determined approximate area by using a narrower beam, so as to determine a narrow beam for communication with the UE based on the scanning results. Unlike the prior-art technical solutions in which a whole spatial channel is scanned in a traversal manner by using a narrow beam, the technical solutions provided in this embodiment of the present invention can significantly reduce a channel scanning time, reduce overheads, and improve system efficiency.

The examples and embodiments disclosed herein may be provided or implemented as a method, a system, or a computer program product. The disclosed examples and embodiments may use a form of hardware only embodiments, software only embodiments, or embodiments with a combination of software and hardware. Moreover, the disclosed examples and embodiments may use a form of a computer program product that is implemented on one or more computer-usable storage media (including but not limited to a disk memory, a CD-ROM, an optical memory, and the like) that include computer-usable program code.

The disclosed examples and embodiments are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

Although some examples and embodiments have been described, any number of changes and modifications to the embodiments can be made in line with the disclosed communication techniques without departing from the spirit and scope of the present examples and embodiments. The present examples and embodiments are intended to cover such modifications and variations within the scope of the following claims.

What is claimed is:

1. A communication beam determining method, comprising:

respectively sending, by a network side device, downlink sounding signals by using M beams with a first width, wherein main lobe directions of any two of the M beams with the first width are different, and M is an integer and not less than 2;

receiving, by the network side device, sounding results including downlink sounding signals that are returned by user equipment (UE), and determining N beams with a second width based on the sounding results, wherein the second width is less than the first width, a coverage area of a set of the N beams with the second width is smaller than a coverage area of a set of the M beams with the first width, and N is an integer not less than 2; and respectively sending, by the network side device, downlink scanning signals by using the N beams with the second width, and determining, based on scanning results including the downlink scanning signals and that are returned by the UE, a first beam for data transmission with the UE.

2. The method according to claim 1, further comprises:
obtaining, by the network side device, channel change information of the UE;
generating, by the network side device, at least two tracking beams based on the channel change information and the first beam; and
respectively sending, by the network side device, downlink tracking signals by using the at least two tracking beams, and updating, based on tracking results of the downlink tracking signals that are returned by the UE, the first beam for data transmission with the UE.

3. The method according to claim 1, wherein the sounding results comprise largest received signal strength information of the downlink sounding signals; and wherein the determining, by the network side device, N beams with the second width based on the sounding results comprises:
determining, by the network side device, a second beam that is in the M beams with the first width and that is corresponding to largest received signal strength of the downlink sounding signals; and
determining, by the network side device, the N beams with the second width based on the second beam, wherein the coverage area of the set of the N beams with the second width is corresponding to a coverage area of the second beam.

4. The method according to claim 1, wherein the scanning results comprise received signal strength information of the downlink scanning signals; and the determining, by the network side device, the first beam based on the scanning results comprises:
determining, by the network side device, a beam that is in the N beams with the second width and that is corresponding to largest received signal strength of the downlink scanning signals, wherein the determined beam is the first beam.

5. The method according to claim 1, wherein the scanning results comprise received signal strength information of the downlink scanning signals; and wherein the determining, by the network side device, the first beam based on the scanning results comprises:
updating, by the network side device, channel information based on received signal strength corresponding to each beam with the second width, and determining the first beam based on the channel information.

6. A communication beam determining method comprising:
receiving, by user equipment (UE), at least one of downlink sounding signals that are sent by a network side device by using M beams with a first width, wherein M is an integer and not less than 2;
returning, by the UE, a sounding result of the at least one downlink sounding signal to the network side device, wherein the sounding result is used by the network side device to determine N beams with a second width, the second width is less than the first width, a coverage area of a set of the N beams with the second width is smaller than a coverage area of a set of the M beams with the first width, and N is an integer and not less than 2;
receiving, by the UE, downlink scanning signals respectively sent by the network side device by using the N beams with the second width; and
returning, by the UE, scanning results of the downlink scanning signals to the network side device, wherein the scanning results are used by the network side device to determine a first beam for data transmission with the UE.

7. The method according to claim 6, further comprising:
receiving, by the UE, downlink tracking signals respectively sent by the network side device by using at least two tracking beams, wherein the at least two tracking beams are generated by the network side device based on channel change information and the first beam; and
returning, by the UE, tracking results of the downlink tracking signals to the network side device, wherein the tracking results are used by the network side device to update the first beam for data transmission with the UE.

8. The method according to claim 6, wherein the sounding result comprises received signal strength information of the at least one downlink sounding signal.

9. The method according to claim 6, wherein the scanning result comprises received signal strength information of each of the N downlink scanning signals.

10. A communication beam determining apparatus comprising:
a sending module configured to respectively send downlink sounding signals by using M beams with a first width, wherein main lobe directions of any two of the M beams with the first width are different, and M is an integer and not less than 2;
a receiving module configured to receive sounding results that are of the downlink sounding signals and that are returned by user equipment (UE); and
a processing module configured to determine N beams with a second width based on the sounding results, wherein the second width is less than the first width, a coverage area of a set of the N beams with the second width is smaller than a coverage area of a set of the M beams with the first width, and N is an integer and not less than 2, wherein
the sending module is further configured to respectively send downlink scanning signals by using the N beams with the second width;
the receiving module is further configured to receive scanning results that are of the downlink scanning signals and that are returned by the UE; and
the processing module is configured to determine a first beam for data transmission with the UE based on the scanning results.

11. The apparatus according to claim 10, wherein the processing module is further configured to obtain channel change information of the UE; and generate at least two tracking beams based on the channel change information and the first beam;
the sending module is further configured to respectively send downlink tracking signals by using the at least two tracking beams;
the receiving module is further configured to receive tracking results that are of the downlink tracking signals and that are returned by the UE; and
the processing module is further configured to update the first beam for data transmission with the UE based on the tracking results returned by the UE.

12. The apparatus according to claim 10, wherein the sounding result comprises largest received signal strength information of the downlink sounding signals; and
the processing module is configured to: determine a second beam that is in the M beams with the first width and that is corresponding to largest received signal strength of the downlink sounding signals; and determine the N beams with the second width based on the second beam, wherein the coverage area of the set of the N beams with the second width is corresponding to a coverage area of the second beam.

13. The apparatus according to claim 10, wherein the scanning result comprises received signal strength information of the downlink scanning signals; and the processing module is configured to determine a beam that is in the N beams with the second width and that is corresponding to largest received signal strength of the downlink scanning signals, wherein the determined beam is the first beam.

14. The apparatus according to claim 10, wherein the scanning results comprises received signal strength information of the downlink scanning signals; and the processing module is configured to update channel information based on received signal strength corresponding to each beam with the second width, and determine the first beam based on the channel information.

15. A communication beam determining apparatus comprising:

a receiving module configured to receive at least one of downlink sounding signals that are sent by a network side device by using M beams with a first width, wherein M is not less than 2;

a processing module configured to generate a sounding result of the at least one downlink sounding signal; and a sending module configured to return the sounding result to the network side device, wherein the sounding result is used by the network side device to determine N beams with a second width, the second width is less than the first width, a coverage area of a set of the N beams with the second width is smaller than a coverage area of a set of the M beams with the first width, and N is not less than 2; wherein the receiving module is further configured to receive downlink scanning signals respectively sent by the network side device by using the N beams with the second width;

the processing module is further configured to generate scanning results of the downlink scanning signals; and the sending module is further configured to return the scanning results to the network side device, wherein the scanning results are used by the network side device to determine a first beam for data transmission with the apparatus.

16. The apparatus according to claim 15, wherein the receiving module is further configured to receive downlink tracking signals respectively sent by the network side device by using at least two tracking beams, wherein the at least two tracking beams are generated by the network side device based on channel change information and the first beam;

the processing module is further configured to generate tracking results of the downlink tracking signals; and the sending module is further configured to return the tracking results to the network side device, wherein the tracking results are used by the network side device to update the beam for data transmission with the apparatus.

17. The apparatus according to claim 15, wherein the sounding result comprises received signal strength information of the at least one downlink sounding signal.

18. The apparatus according to claim 15, wherein the scanning results comprise received signal strength information of each of the N downlink scanning signals.

* * * * *